(12) United States Patent
Singh

(10) Patent No.: US 8,674,559 B2
(45) Date of Patent: Mar. 18, 2014

(54) DC-DC CONVERTER

(75) Inventor: Jagdip Singh, Den Bosch (NL)

(73) Assignee: NXP B.V., Eindhoven (NL)

( * ) Notice: Subject to any disclaimer, the term of this patent is extended or adjusted under 35 U.S.C. 154(b) by 356 days.

(21) Appl. No.: 13/187,896

(22) Filed: Jul. 21, 2011

(65) Prior Publication Data

US 2012/0019303 A1    Jan. 26, 2012

(30) Foreign Application Priority Data

Jul. 23, 2010 (EP) .................................... 10170704

(51) Int. Cl.
*G05F 3/06*    (2006.01)

(52) U.S. Cl.
USPC ........................................................ 307/151

(58) Field of Classification Search
USPC ........................................................ 307/151
See application file for complete search history.

(56) References Cited

U.S. PATENT DOCUMENTS

| | | |
|---|---|---|
| 2008/0136500 A1 | 6/2008 | Frulio et al. |
| 2010/0166228 A1 | 7/2010 | Steele et al. |
| 2010/0315272 A1* | 12/2010 | Steele et al. ................. 341/110 |

FOREIGN PATENT DOCUMENTS

| | | |
|---|---|---|
| JP | 2008-153981 A | 7/2008 |
| WO | 2005/055406 A1 | 6/2005 |
| WO | 2010/052610 A1 | 5/2010 |

OTHER PUBLICATIONS

Wu, J-T, et al. "MOS Charge Pumps for Low-Voltage Operation," IEEE. J. of Solid-State Circuits, vol. 33, No. 4, pp. 592-597 (Apr. 1998).

Ying, T. et al. "Area-Efficient CMOS Charge Pumps for LCD Drivers," IEEE. J. of Solid-State Circuits, vol. 38, No. 10, pp. 1721-1725 (Oct. 2003).

Extended European Search Report for European Patent Appln. No. 10170704.0 (Jan. 20, 2011).

* cited by examiner

*Primary Examiner* — Robert L. Deberadinis

(57) ABSTRACT

Consistent with example embodiment, a DC-DC converter is adapted to supply a MEMS device comprising an input for receiving a DC voltage (Vs), an output for transmitting a supplied voltage (V1) to the MEMS device. The DC-DC converter further comprises a biasing circuit (MNBC) for biasing a first node (Vmi) and a second node (Vme) with a first biasing voltage (Vm1) and a second biasing voltage (Vm2).

15 Claims, 6 Drawing Sheets

DC-DC CONVERTER

CROSS-REFERENCE TO RELATED APPLICATIONS

This application claims the priority under 35 U.S.C. §119 of European patent application no. 10170704.0, filed on Jul. 23, 2010, the contents of which are incorporated by reference herein.

FIELD OF THE INVENTION

The invention relates to a DC-DC converter and more specifically to a DC-DC converter adapted to work with a micro-electromechanical system or MEMS device.

BACKGROUND OF THE INVENTION

MEMS devices are more and more used in microelectronics, the market of these devices continually increasing every year. As an example of a MEMS device we shall use, for the purpose of this application a MEMS microphone. The MEMS microphone market is approximately doubling every year.

FIG. 1 depicts a typical DC-DC converter adapted to supply a MEMS microphone and in general to a MEMS device, which is denoted MEMS in FIG. 1. The converter receives an input direct current (DC) voltage Vs and converts it into two higher level DC voltages V1 and V2. The voltage V1 is transmitted to the MEMS device via the pairs of diodes D1,D2. The V2 is transmitted to the middle node of two capacitors in series via diodes D3,D4. The diodes are connected in the well-known back to front connection or anti-parallel. Sw1 switch which intermittently connect the said voltage to the MEMS device. Sw2 switch which intermittently connect the said voltage to the middle node of two capacitors in serives. In parallel with the MEMS device there is a series connection of two equal-value capacitors C1 and C2. The capacitors determine a mid-point voltage Vme and further smooth the voltages V1 and V2.

There are some issues related to this DC-DC converter and we shall outline them assuming that the output voltage of the converter is 10.77 volt and the MEMS device is a MEMS microphone.

Problem 1. The 10.7V DC-DC converter needs also a load capacitor of 45 pF for MEMS Microphone. So, C1=C2=90 pF are used. The voltage at the middle node between two series capacitors should be maintained between maximum of 5.5V and minimum 5.3V (which is about half of the output voltage of 10.7V). If this middle node voltage (MNV) goes above 5.5V (e.g. 6V) then the capacitor C2 can be damaged and 10.7V DC-DC converter becomes useless.

Problem 2. During startup the middle node voltage may go beyond 5.5V. Again this will damage the capacitor C2 and the 10.77V DC-DC converter will not work properly anymore. This is a newly identified problem, which was not previously reported.

Problem 3. The ripple at output voltage V1=10.77V does not meet specifications of below 10 uV.

SUMMARY OF THE INVENTION

Hence, it is a need, of a DC-DC converter for a MEMS device which overcomes part or all of the above-mentioned problems.

It is therefore an object of the invention to provide A DC-DC converter adapted to supply a MEMS device comprising:

an input for receiving a DC voltage;

an output for transmitting a supplied voltage to the MEMS device; the DC-DC converter further comprising a biasing circuit for biasing a first node and a second node with a first biasing voltage and a second biasing voltage. This has the advantage that the value of the voltage at the first and the second node is maintained at almost half of the supply voltage.

In an embodiment of the invention, the DC-DC further comprises a first set of level shifters serially coupled between the input and a supply terminal receiving a supply voltage, the first set of level shifters determining a partition of the supply voltage into equally spaced voltage levels, the first biasing voltage and the second biasing voltage being a subset of two of the equally spaced voltage levels. Using this arrangement one should not use calibrated resistors for creating the necessary voltages for the said nodes. Furthermore, the resistors should have a very high value that would determine a consumption of a large portion of the circuit layout.

In another embodiment of the invention, the DC-DC converter further comprises a first switch circuit and a second switch circuit, the first switch circuit being coupled to a sixth voltage level generated by the first set of the level shifters, the second switch circuit being coupled the first biasing voltage and the second biasing voltage. With this arrangement it is no need for a calibrated voltage level in the circuit.

In yet another embodiment of the invention, the DC-DC converter further comprises a second set of level shifters coupled to the first set of level shifters, the second set of level shifters generating a first control signal and a second control signal, the first control signal controlling the first switch circuit and the second control signal controlling the second switch circuit.

In this way there is a correlation between the level shifters which determines the voltage levels of the nodes and the voltage control of the switches.

In another embodiment of the invention, the second set of level shifters of the DC-DC converter comprise a first level shifter being supplied by one of the equally spaced voltage levels, and a second level shifter being supplied by a second one of the equally spaced voltage levels.

In another embodiment of the invention the equally spaced voltages are indexed from 1 to 7, wherein a first voltage equals the equally space voltage and any higher level voltage equals the preceding voltage level plus the equally spaced voltage and wherein the first biasing voltage and the second biasing voltage are obtained using a first pair of transistors and a second pair of transistors, each pair of transistors being controlled by two consecutive equally spaced voltages, said pairs of transistors being connected in series between a next consecutive level of the two consecutive equally spaced voltages and a reference terminal.

In another embodiment of the invention the each of the first node and the second node is coupled to a reference terminal via a filter. That will determine a further filtering of the signals, contributing to reducing the parasitic high frequency components of the signals.

Furthermore, each switch comprises substrate selection MOS transistors.

The invention is defined by the independent claims. Dependent claims define advantageous embodiments.

BRIEF DESCRIPTION OF THE DRAWINGS

The above and other advantages will be apparent from the exemplary description of the accompanying drawings in which.

DETAILED DESCRIPTION OF EMBODIMENTS

Figure 2:
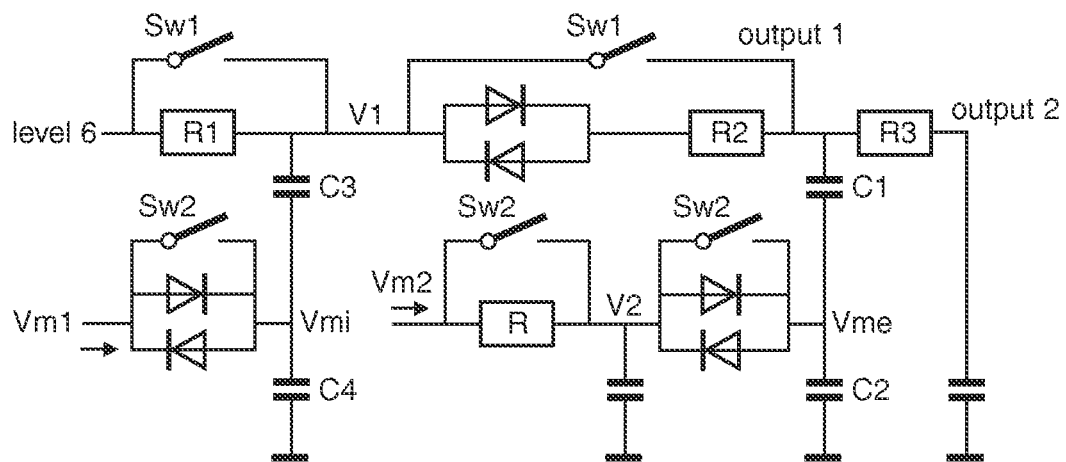
FIG. 2 depicts a first embodiment of the invention.
Figure 3:
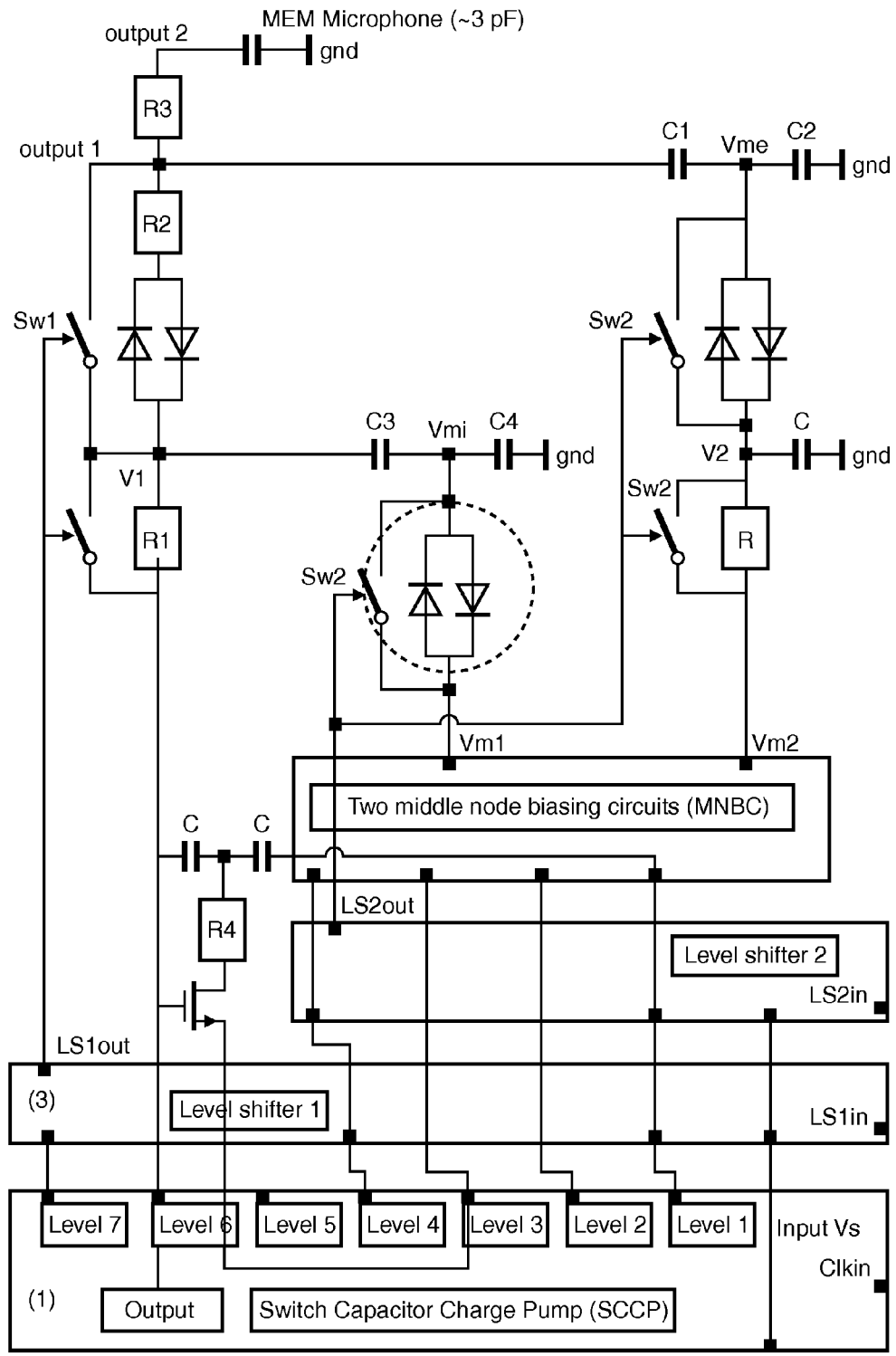
FIG. 3 depicts a more detailed view of the DC-DC converter, according to the invention.
Figure 4:
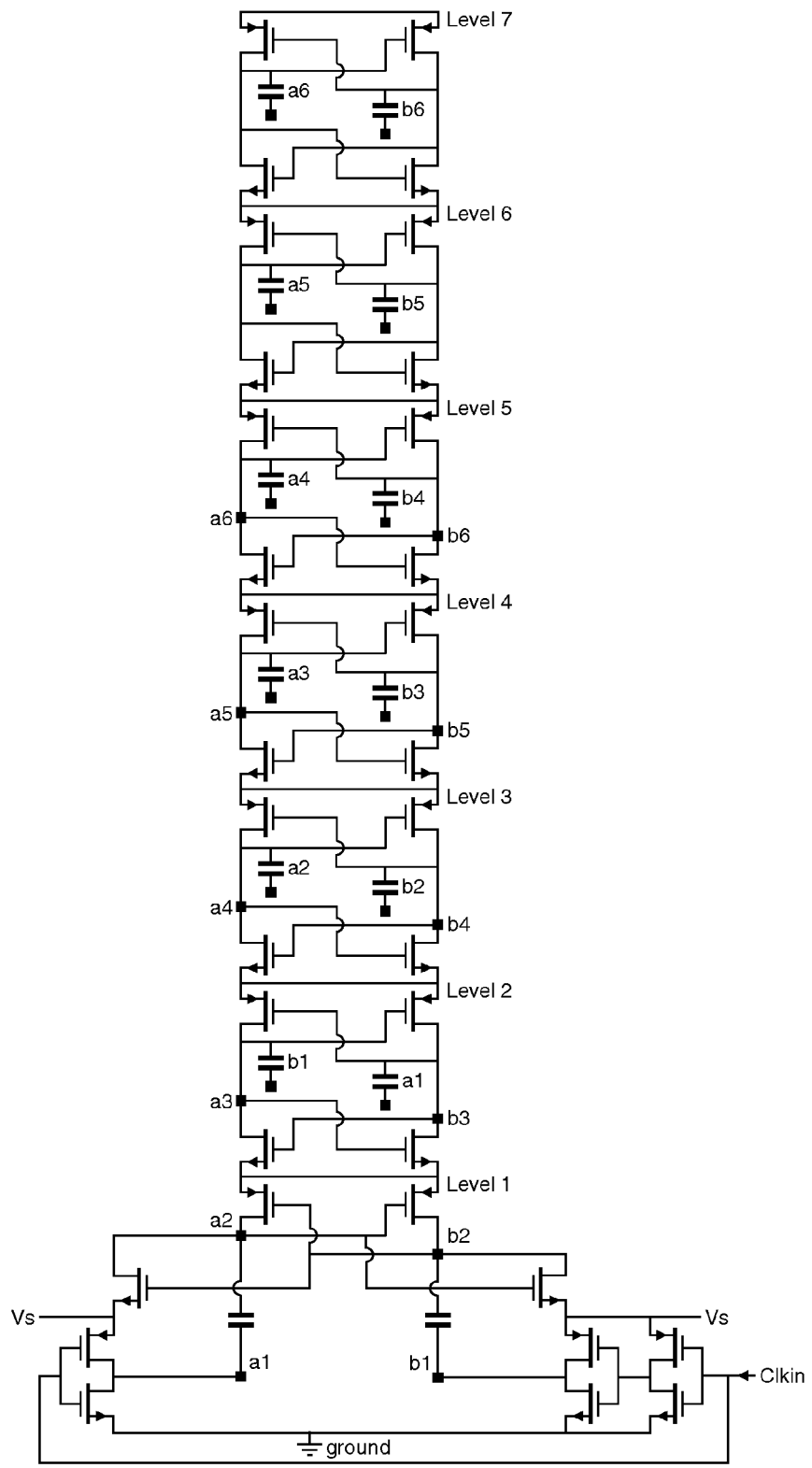
FIG. 4 depicts a more detailed view of the first level shifter, according to the invention.

The new DC-DC Converter architecture consists of a set of circuits described in the FIGS. 2, 3 and 4.

In FIG. 4 it is shown a Switch Capacitor Charge Pump (SCCP). It generates an output voltage of 10.77V from input voltage of 1.65V. It has seven gain levels. When input voltage (at node Vs) is 1.65V, the voltage at each gain level equals=1.65+(1.52V*Gain level number). Gain Level number is an integer number between 1 and 6. The 10.77V voltage is outputted at level 6. After the diodes of FIGS. 2 and 3, the output voltage at node 'output 2' in FIGS. 2 and 3 can be a few mV lower then voltage at node 'level 6'. Voltage drop across diodes is proportionally to the leakage current in the MEMS microphone. It has an additional 7$^{th}$ level for providing 12.2V to level Shifter 1.

Figure 5:
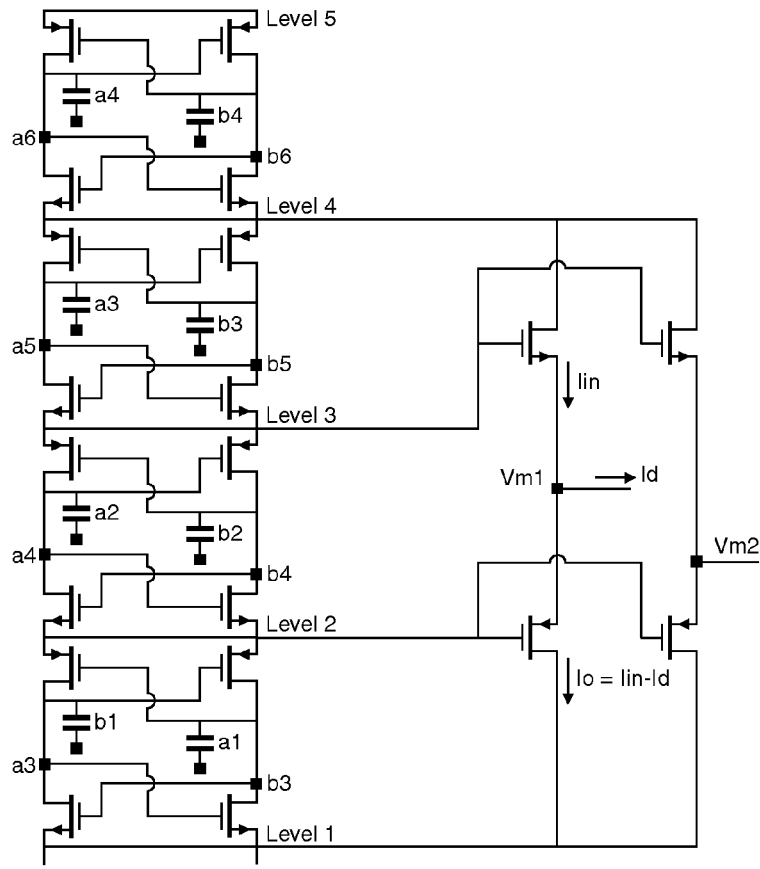
FIG. 5 depicts a more detailed view of the nodes voltages generation, according to the invention.

The architecture further comprises a Middle Node Biasing Circuit (MNBC) as it is shown in FIGS. 3 and 5. The MNBC generates nodes voltages of about 5.4V when output voltage is 10.7V. This was made because there was no stable voltage node on the Switch Capacitor Charge Pump (SCCP) that could be used to generate 5.4V.

There were also two voltage levels at the output nodes Vm1 and Vm2 needed to bias the middle node of two sets of two capacitors in series. The external two series capacitors are 90 pF each. The internal two series capacitors are of 9 pF each. This circuit is also suitable for keeping the voltage level of 5.4V stable also when a very large current is drawn from the Middle node biasing circuit.

Figure 7:
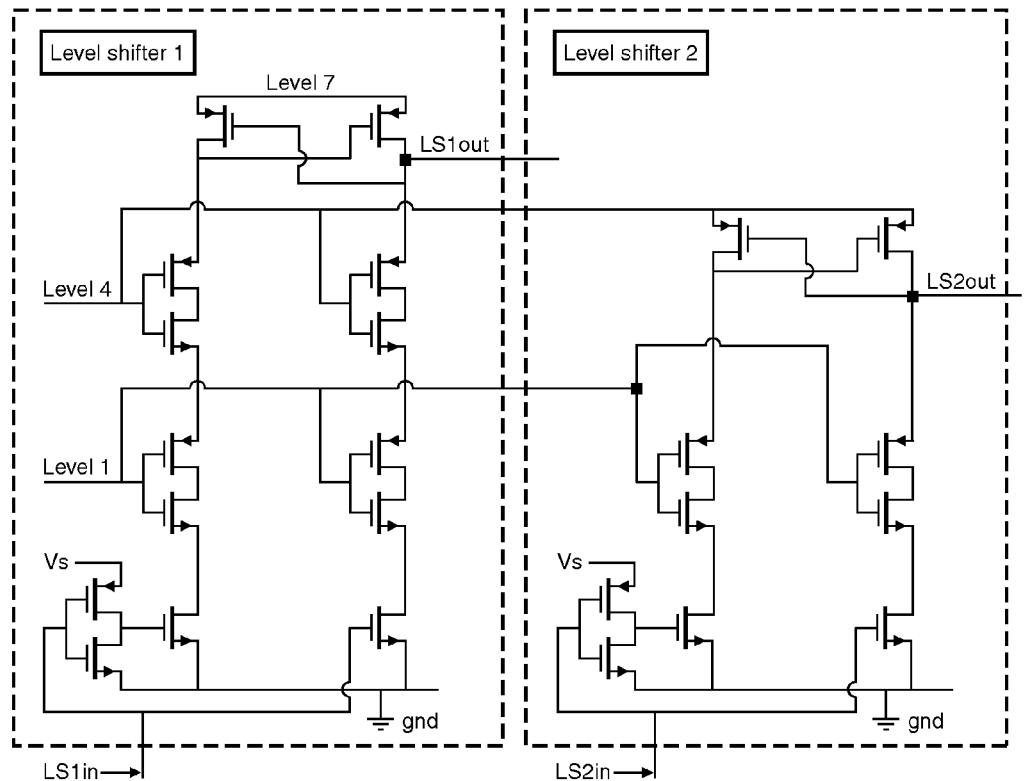
FIG. 7 depicts a more detailed view of the second level shifter circuit.
Figure 8:
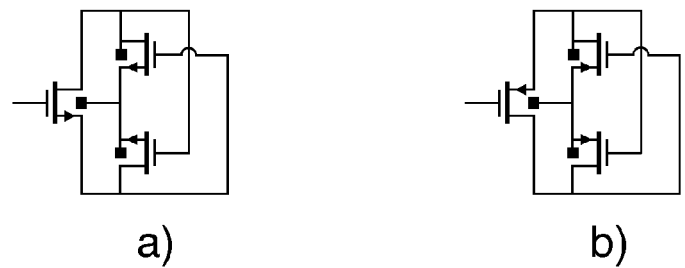
FIG. 8a depicts a substrate selection n-MOS transistor.
FIG. 8b depicts a substrate selection p-MOS transistor.

There are two Level Shifter Circuits (LS) which are shown in FIGS. 4 and 8, respectively. They are used to open and close the switches across the anti-parallel diodes. Closing the switches decreases the start up time to reach 10.7V at the output of the DC-DC converter. Two level shifter circuits are needed so that one switch opens slightly later then the other. Level shifter 2, as shown in FIG. 8, opens the switch Sw2 across the diodes about 10 u seconds after level shifter 1, shown in FIG. 3, opens switch Sw1. In the level shifters, regenerative feedback circuit response time is slow, as shown in FIG. 7. The regenerative feedback circuit response is two PMOS transistos connected level 7 for level shifter 1 in FIG. 7. The regenerative feedback circuit response is two PMOS transistos connected level for level shifter 2. The response time is made slow by having very long channel length transistors in the regenerative feedback circuits. This is because less current is then needed and a charge pump (SCCP) that provides less current is needed. Hence, the result is a reduction of the chip area of charge pump (SCCP). In FIGS. 3 and 7, level shifter 1 converts 1.8V, received at the input node LS1in, to 12.2V, at node LS1out and converts 0V, at input node LS1in, to 7.85V at node LS1out. Level shifter 2 converts 1.8V from the input node LS2 in to 7.85V, at node LS2out and converts 0V to 3.2V at node LS2out.

Figure 1:
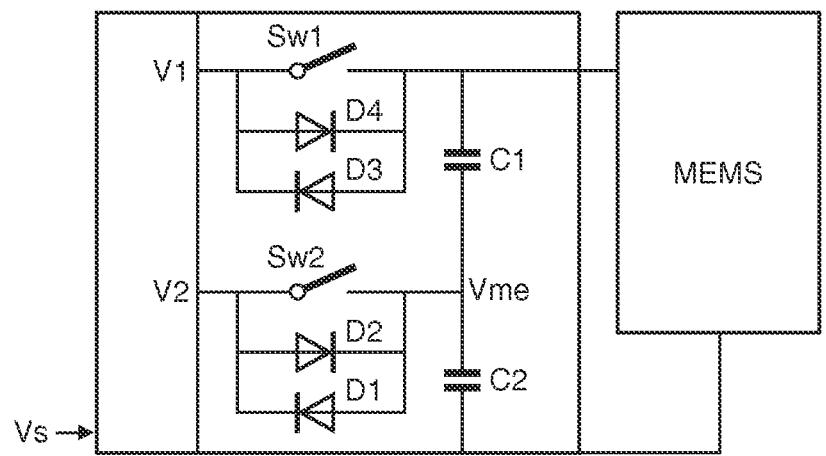
FIG. 1 depicts a typical DC-DC converter driving a MEMS device.

When the switch Sw2 (FIG. 1) is closed it makes a low impedance short circuit to middle node Vme i.e. the node between the series capacitors from output node Vm2 of the Middle node biasing circuit (MNBC). The switch is across the anti-parallel diodes, forcing the voltage at node Vme to be 5.4V. The switches Sw1 and Sw2 are only opened after the output voltage of DC-DC converter is settled to about 10.77V. By closing the switch prevents the voltage across capacitor C2 of FIG. 1 to go over 5.5V. If the switch Sw2 is not closed during start up then, voltage across capacitor C2 goes above 5.5. V because the voltage of the middle node, Vme rises faster then the voltage at the output node i.e. node output 1. In sequence, the middle node Vme of the two series capacitors rises first to 5.4V. Then after some time voltage at the output i.e. the node output 1, top plate of capacitor C1 rises to 10.77, and this voltage adds extra voltage across capacitor C2 because of the series capacitors form a capacitor voltage divider.

In order to reduce the ripple of the output voltage there are provided low-pass filters, as it is shown in FIG. 2. A first second order filter is provided at the output of the switch capacitor charge pump (SCCP). This filter is connected between the node 'level 6' to the node 'output 1'. There is also another second order filter between the output of one of middle node biasing circuit and external middle node. This filter is connected between the node Vm2 to the node Vme. The other middle node biasing circuit has a first order filter at its output. The output of the filter is connected to internal middle node between capacitors C4 and C3 in FIG. 2. The filter is connected between the node Vm1 and the node Vmi.

In order to further reduce the ripple of the output voltage, at the output of charge pump, Small Output Resistors (SMOR) e.g. R2 and R3 in FIG. 2, are added to reduce ripple on 10.7V. R2 in series with C1 and C2 form a filter to reduce the ripple that feeds through the parasitic capacitors across anti-parallel diodes. The resistor R3 is connected in series with microphone capacitance, thus forming for filtering out the ripple that feed through the External middle node, Vme, to node 'output 1'.

Hence, combing all the above-described filters determines a reduction of the ripple of the output voltage to e.g. 3 uV.

In FIG. 4, between two levels there are two PMOS Transistors connected together as they would be in regenerative feedback network. Also two NMOS transistors connected together as they would be in regenerative feedback network. It is further observed that the devices having the same label on their terminals are connected together. Also for this design, a preferred input clock frequency of 2.4 MHz is used into the node Clkin. However other clock frequencies can be used.

There are two 'middle node biasing circuits' shown in FIG. 5. Both Middle node Biasing Circuits are made of NMOS and PMOS transistors connected in source follower topology. The output of first transistor is node Vm1 and the output of second transistor is node Vm2.

The gate of the PMOS transistor is connected to level 2. its source is connected to middle nodes Vm1 or Vm2, which each is 5.4V voltage node. Its drain connected to level 1. The gate of the NMOS transistor is connected to level 3, its source is connected to the middle node Vm1 or Vm2 and its drain is connected to level 4. These provide a good performance voltage source because the impedance is very small at middle node Vm1 or Vm2. Its input impedance is about 1/(gmp+gmn), where gmp and gmn are the trans-conductance of the PMOS and NMOS transistor, respectively.

Figure 6:
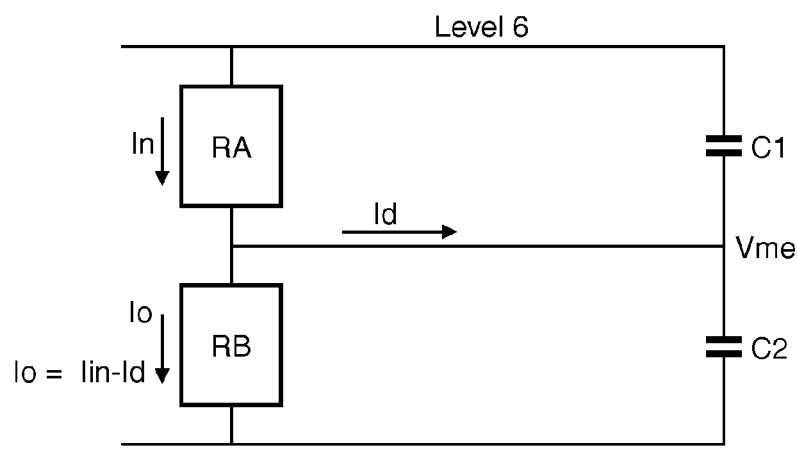
FIG. 6 depicts a resistor based voltage generation of the nodes voltages.

The solutions presented, so far, have several advantages over previous solution as:

There is an advantage for middle node biasing circuit when compared with the alternative solution consisting in providing a resistor ladder between level 6 and ground as it is shown in FIG. 6. For the circuit shown in FIG. 6, very large resistors are needed for having a low current through them. However, large resistor layout is provided, in this case, with long length and narrow width. Narrow width causes mismatch and so getting the precise 5.4V more difficult. Also long length means large chip area. It was calculated if resistance was 100 MOhms the area would be 3 times more then the solution according to this invention. The layout of 1 MOhms resistors having near minimum width of 0.4 um will have a length of 100 um. Also a hundred of these 1 MOhms resistors will be needed and therefore a large area will be occupied.

Additionally, the impedance at the connection between the two resistors i.e. the middle node, is very high i.e. 25 Mohms and, therefore, the output impedance of the voltage source is very high determining a large drop of the middle node voltage from 5.4 V, if a small current is drawn from it. Where as in solution presented in FIG. 5 it doesn't.

Furthermore, since the middle node biasing circuit is not taking current from the output node i.e. level 6 in FIG. 5 it is also not increasing the ripple at the output node as the old solution would.

Let us further observe that the middle node biasing circuit in steady state i.e. after output voltage reaches 10.77V, does not take current from input voltage e.g. 1.65V, since it circulates the current in a loop from level 1 to level 4 and then back to level 1 from level 4. The only current loss is due to substrate leakage, which is about few Pico amperes to 1-nano amperes. In the known solution all of the current through the resistor ladder will be lost through ground.

This circuit provides a better ripple performance then the known solutions in the art. This improves the SNR i.e. Signal to Noise Ratio performance of the MEMS device.

Each NMOS has substrate selection switches as shown in FIG. 8a. All of DC-DC converters NMOS transistors have these selection switches, excepting the ones connected to ground. Each PMOS has substrate selection switches as shown in FIG. 8b. All of the PMOS transistors in DC-DC converter have these switches.

Figure 9:
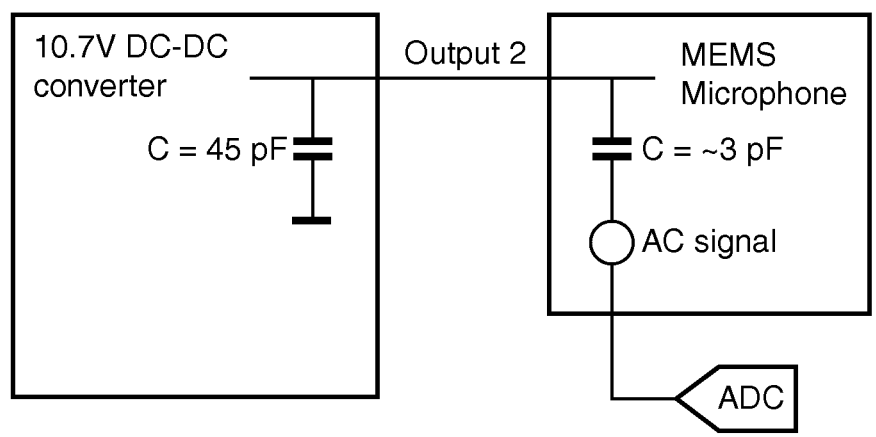
FIG. 9 depicts a typical connection of a MEMS device to the DC-DC converter and to an external signal source.

This invention is used to provide a bias voltage to a MEMS device as e.g. a MEMS microphone as it is shown in FIG. 9. The Signal from the MEMS microphone is input to an Analog to Digital Converter (ADC). The higher the voltage MEMS microphone is biased with the better the sensitivity of the MEMS Microphone. The 45 p capacitor is to make sure the AC signal generate from microphone is not lost in the 10.7 VDC-DC converter but that most of it goes to ADC.

Similarly 10.7V DC-DC converter can be used to bias voltage of other MEMS sensors.

It is remarked that the scope of protection of the invention is not restricted to the embodiments described herein. Neither is the scope of protection of the invention restricted by the reference numerals in the claims. The word "comprising" does not exclude other parts than those mentioned in the claims. The word "a(n)" preceding an element does not exclude a plurality of those elements. Means forming part of the invention may both be implemented in the form of dedicated hardware or in the form of a programmed purpose processor. The invention resides in each new feature or combination of features.

The invention claimed is:

1. A DC-DC converter adapted to supply a MEMS device, comprising:
   an input for receiving a DC voltage;
   an output for transmitting a supplied voltage to the MEMS device;
   a biasing circuit for biasing a first node and a second node with a first biasing voltage and a second biasing voltage; and
   a first set of level shifters serially coupled between the input and a supply terminal receiving a supply voltage, the first set of level shifters determining a partition of the supply voltage into equally spaced voltage levels, the first biasing voltage and the second biasing voltage being a subset of two of the equally spaced voltage levels.

2. A DC-DC converter as claimed in claim 1 further comprising a first switch circuit and a second switch circuit, the first switch circuit being coupled to a voltage level generated by the first set of the level shifters, the second switch circuit being coupled to the first biasing voltage and the second biasing voltage.

3. A DC-DC converter as claimed in claim 2 further comprising a second set of level shifters coupled to the first set of level shifters, the second set of level shifters generating a first control signal and a second control signal, the first control signal controlling the first switch circuit and the second control signal controlling the second switch circuit.

4. A DC-DC converter as claimed in claim 3, wherein the second set of level shifters comprise a first level shifter being supplied by one of the equally spaced voltage levels, and a second level shifter being supplied by a second one of the equally spaced voltage levels.

5. A DC-DC converter as claimed in claim 1, wherein the equally spaced voltages are indexed from 1 to 7, wherein a first voltage equals the equally spaced voltage and any higher level voltage equals the preceding voltage level plus the equally spaced voltage and wherein the first biasing voltage and the second biasing voltage are obtained using a first pair of transistors and a second pair of transistors, each pair of transistors being controlled by two consecutive equally spaced voltages, said pairs of transistors being connected in series between a next consecutive level of the two consecutive equally spaced voltages and a reference terminal.

6. A DC-DC converter as claimed in claim 1 wherein each of the first node and the second node is coupled to a reference terminal via a filter.

7. A DC-DC converter as claimed in claim 1 wherein a switch comprises a substrate selection MOS transistor.

8. A DC-DC converter adapted to supply a MEMS device, comprising:
   an input for receiving a DC voltage;
   an output for transmitting a supplied voltage to the MEMS device;
   a biasing circuit for biasing a first node and a second node with a first biasing voltage and a second biasing voltage; and
   wherein the first node and the second node are a middle node of two sets of two capacitors in series connected between a reference terminal and said output.

9. The DC-DC converter as claimed in claim 8, further comprising a first set of level shifters serially coupled between the input and a supply terminal receiving a supply voltage, the first set of level shifters determining a partition of the supply voltage into equally spaced voltage levels, the first biasing voltage and the second biasing voltage being a subset of two of the equally spaced voltage levels.

10. The DC-DC converter as claimed in claim 9 further comprising a first switch circuit and a second switch circuit for protecting the capacitors of the two sets of capacitors during startup, the first switch being coupled to a voltage level generated by the first set of the level shifters, the second switch circuit being coupled to the first biasing voltage and the second biasing voltage.

11. The DC-DC converter as claimed in claim 10 further comprising a second set of level shifters coupled to the first set of level shifters, the second set of level shifters generating a first control signal and a second control signal, the first control signal controlling the first switch circuit and the second control signal controlling the second switch circuit.

12. The DC-DC converter as claimed in claim 11, wherein the second set of level shifters comprise a first level shifter being supplied by one of the equally spaced voltage levels, and a second level shifter being supplied by a second one of the equally spaced voltage levels.

13. The DC-DC converter as claimed in claim 9, wherein the equally spaced voltages are indexed from 1 to 7, wherein a first voltage equals the equally spaced voltage and any higher level voltage equals the preceding voltage level plus the equally spaced voltage and wherein the first biasing voltage and the second biasing voltage are obtained using a first pair of transistors and a second pair of transistors, each pair of transistors being controlled by two consecutive equally spaced voltages, said pairs of transistors being connected in series between a next consecutive level of the two consecutive equally spaced voltages and a reference terminal.

14. The DC-DC converter as claimed in claim 8 wherein each of the first node and the second node is coupled to a reference terminal via a filter.

15. The DC-DC converter as claimed in claim 8 wherein a switch comprises a substrate selection MOS transistor.

* * * * *